United States Patent
Osawa

(10) Patent No.: US 9,199,589 B2
(45) Date of Patent: Dec. 1, 2015

(54) VEHICLE-SIDE CHARGING CONNECTOR WITH CONNECTOR MAIN BODY USABLE WITH PLURAL DIFFERENT VEHICLES

(75) Inventor: Kiyoshi Osawa, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 22 days.

(21) Appl. No.: 14/354,364

(22) PCT Filed: Sep. 10, 2012

(86) PCT No.: PCT/JP2012/073055
§ 371 (c)(1),
(2), (4) Date: Jul. 1, 2014

(87) PCT Pub. No.: WO2013/061698
PCT Pub. Date: May 2, 2013

(65) Prior Publication Data
US 2014/0315426 A1 Oct. 23, 2014

(30) Foreign Application Priority Data

Oct. 25, 2011 (JP) .................... PCT/JP2011/074495

(51) Int. Cl.
*H01R 13/60* (2006.01)
*H01R 13/66* (2006.01)
*B60R 16/03* (2006.01)
*B60L 11/18* (2006.01)
*H01R 13/74* (2006.01)
*H01R 13/512* (2006.01)

(52) U.S. Cl.
CPC ................ *B60R 16/03* (2013.01); *B60L 11/18* (2013.01); *B60L 11/1818* (2013.01); *H01R 13/748* (2013.01); *H01R 13/512* (2013.01)

(58) Field of Classification Search
CPC ..... B60R 16/03; B60L 11/1818; B60L 11/18; H01R 13/512; H01R 13/748
USPC .............................................. 439/527, 34, 35
See application file for complete search history.

(56) References Cited

U.S. PATENT DOCUMENTS

| 5,350,320 | A | 9/1994 | Hashizawa et al. |
| 5,582,521 | A | 12/1996 | Mori et al. |
| 8,206,171 | B2 * | 6/2012 | Osawa et al. ................ 439/352 |

FOREIGN PATENT DOCUMENTS

| JP | 6-76880 | 3/1994 |
| JP | 7-192804 | 7/1995 |
| JP | 2009-146711 | 7/2009 |
| JP | 2010-166756 | 7/2010 |

* cited by examiner

*Primary Examiner* — Javaid Nasri
(74) *Attorney, Agent, or Firm* — Gerald E. Hespos; Michael J. Porco; Matthew T. Hespos

(57) ABSTRACT

A vehicle-side connector (10) is fixed to a vehicle body by tightening unillustrated bolts and connected to a charging connector in charging a battery of a vehicle, and includes a connector main body (50) which is made of synthetic resin and to which the charging connector is connected, and a mounting portion (20) which is made of synthetic resin, includes bolt insertion holes (23A) into which the bolts are insertable, and is fixed to the vehicle body by inserting the bolts into the bolt insertion holes (23A) and tightening the bolt into the vehicle body. The mounting portion (20) is selected from a plurality of mounting portions (20) and fixed after being assembled with the connector main body (50).

5 Claims, 16 Drawing Sheets

VEHICLE-SIDE CHARGING CONNECTOR WITH CONNECTOR MAIN BODY USABLE WITH PLURAL DIFFERENT VEHICLES

BACKGROUND

1. Field of the Invention

The present invention relates to a vehicle-side connector to which a charging connector is connected at the time of charging.

2. Description of the Related Art

For example, a vehicle-side connector connected to an end of a wire extending from a battery installed in a vehicle such as an electric vehicle and mounted on a body of the vehicle is known from Japanese Unexamined Patent Publication No. 2010-166756. This vehicle-side connector includes a connector main body made of synthetic resin and to be connected to a charging connector, and a mounting plate made of synthetic resin and integrally provided to the connector main body in such a manner as to protrude outward from the outer peripheral surface of the connector main body. This mounting plate is provided with bolt insertion holes penetrating through the mounting plate in a plate thickness direction, and the vehicle-side connector is mounted and fixed to the vehicle body by inserting fastening bolts into these bolt insertion holes and tightening the fastening bolts into bolt fastening holes provided on the vehicle body.

Intervals between bolt fastening holes on a vehicle body are set at various sizes depending on a manufacturer for manufacturing a vehicle, a vehicle type and the like. Accordingly, intervals between bolt insertion holes on a mounting plate are also changed in accordance with the intervals between the bolt fastening holes. Even if connector main bodies have the same specifications, it is necessary to prepare a plurality of vehicle-side connectors having different intervals between bolt insertion holes in accordance with vehicle types. Further, depending on a manufacturer for manufacturing a vehicle and a vehicle type, a lid portion may be provided to close an opening part on a side of a connector main body to which a charging connector is to be fitted. Considering the presence or absence of the lid portion, it is necessary to prepare even more vehicle-side connectors. Thus, a molding die for integrally molding a connector main body and a mounting plate is manufactured every time a change is made, which leads to a manufacturing cost increase.

The present invention was completed in view of the above situation and an object thereof is to reduce manufacturing cost by sharing a connector main body.

SUMMARY OF THE INVENTION

To achieve the above object, the present invention is directed to a vehicle-side connector which is fixed to a vehicle body by tightening bolts and connected to a charging connector in charging a battery of a vehicle, the vehicle-side connector including a connector main body which is made of synthetic resin and to which the charging connector is connected; and a mounting portion which is made of synthetic resin, includes bolt insertion holes, into which the bolts are insertable, and is fixed to the vehicle body by inserting the bolts into the bolt insertion holes and tightening the bolts into the vehicle body; the mounting portion being fixed after being assembled with the connector main body.

For example, if a vehicle is different, positions of a vehicle body where the bolts are tightened may be changed and intervals between the bolt insertion holes on the mounting plate may also be changed. Thus, in the case of a vehicle-side connector in which a connector main body and a mounting portion are integrally formed, the connector main body also needs to be exchanged. However, according to the above vehicle-side connector, the vehicle-side connector can correspond to various vehicles having different intervals between bolt insertion holes by selecting the mounting portion matching each vehicle body from a plurality of mounting portions having different shapes and sharing the connector main body. Specifically, the vehicle-side connector 10 can correspond to various vehicles by fabricating molding dies for molding only a mounting portion and molding only the mounting portion in correspondence with each vehicle. This can reduce production cost of molding dies as compared with the case of fabricating molding dies for integrally molding a mounting portion and a connector main body.

The following configurations are preferable as embodiments of the present invention.

The mounting portion may include a mounting plate which is formed into a plate-like shape and an accommodating portion which is formed to penetrate through the mounting plate in a front-back direction and into which the connector main body is fitted from behind and the charging connector is fitted from front; a projecting piece capable of coming into surface contact with the mounting plate may be formed to project from the outer surface of the connector main body; and the connector main body and the mounting portion may be integrally assembled by bringing the projecting piece into surface contact with the mounting plate from behind and inserting a plurality of fastening members through the projecting piece from behind and tightening the fastening members into the mounting plate.

According to such a configuration, since the connector main body and the mounting portion can be integrally assembled by the plurality of fastening members, the connector main body can be prevented from being detached from the mounting portion in inserting and withdrawing the charging connector into and from the vehicle-side connector.

Further, if the charging connector is pulled out in a state inclined from a proper posture in withdrawing the charging connector from the vehicle-side connector, a stress associated with the withdrawal concentrates in a fastening part between the connector main body and the mounting portion. However, since the connector main body and the mounting portion are integrally assembled with the projecting piece held in surface contact with the mounting plate from behind according to the above configuration, the stress associated with the withdrawal can be dispersed to the fastening part and a surface contact part. This can prevent the connector main body from being detached from the mounting portion as the charging connector is withdrawn as compared with the case where the connector main body is assembled with the mounting portion from front.

The projecting piece may be formed with a positioning portion fittable to a positioned portion provided on the mounting plate.

According to such a configuration, the mounting portion and the projecting piece can be brought into surface contact without positional deviation by fitting the positioned portion of the mounting plate and the positioning portion of the projecting piece when the projecting piece is brought into surface contact with the mounting plate and the connector main body and the mounting portion are integrally assembled. This can improve operation efficiency in inserting the fastening members through the projecting piece and tightening the fastening members into the mounting plate.

A seal ring may be provided which is held in close contact with the outer peripheral surface of the charging connector and the inner peripheral surface of the connector main body over the entire circumference when the connector main body and the charging connector are properly connected.

Since a vehicle-side connector is generally mounted on an outer side of a vehicle body, water may enter through a clearance between the vehicle-side connector and a charging connector if it rains or snows while the vehicle-side connector and the charging connector are connected and charging is performed. However, according to the above configuration, since the seal ring held in close contact with the inner peripheral surface of the connector main body and the outer peripheral surface of the charging connector is mounted in the connector main body in which the charging connector is accommodated, the entrance of rainwater and the like through the clearance between the vehicle-side connector and the charging connector can be prevented.

The mounting portion may include an accommodating portion into which the charging connector is fitted from front and the connector main body is fitted from behind; and the seal ring may be sandwiched from opposite front and rear sides in a part where the accommodating portion and the connector main body face each other in a front-back direction.

When the accommodating portion and the connector main body are integrally formed, the seal ring is inserted through a front end opening of the accommodating portion and arranged on the back of the accommodating portion using a jig or the like. Thus, operability is poor. However, according to this embodiment, the seal ring can be arranged in a part where the accommodating portion and the connector main body face each other in assembling the mounting portion and the connector main body, wherefore operation efficiency in assembling the seal ring can be improved.

Further, if the mounting portion and the connector main body are separate bodies, rainwater and the like may enter through an interface between the accommodating portion and the connector main body. However, since the seal ring is sandwiched from the opposite front and rear sides by the accommodating portion and the connector main body, the entrance of water and the like through the interface between the accommodating portion and the connector main body can be prevented.

A lid portion may be provided for closing an opening part of the connector main body into which the charging connector is fitted; and the lid portion may be provided on the mounting portion.

Due to a difference in vehicle type, whether or not to provide the lid for closing the opening part of the connector main body differs. Thus, in the case of providing the lid portion on an opening edge part of the connector main body, two types of connector main bodies need to be prepared depending on the presence or absence of the lid portion. However, according to the above configuration, since the lid is provided on the mounting portion attachable to and detachable from the connector main body, the presence or absence of the lid portion can be dealt with by sharing the connector main body and exchanging only the mounting portion. This can reduce manufacturing cost for molding dies and the like.

According to the present invention, it is possible to reduce manufacturing cost by sharing a connector main body.

DETAILED DESCRIPTION OF THE PREFERRED EMBODIMENTS

A first embodiment of the present invention is described with reference to FIGS. 1 to 12.

A vehicle-side connector 10 of this embodiment is connected to an end of a wire extending from a battery installed in a vehicle such as an electric vehicle and fixed to an unillustrated body of the vehicle, and an unillustrated charging connector connected to an external power source is connected thereto from front in charging the battery.

Figure 5:
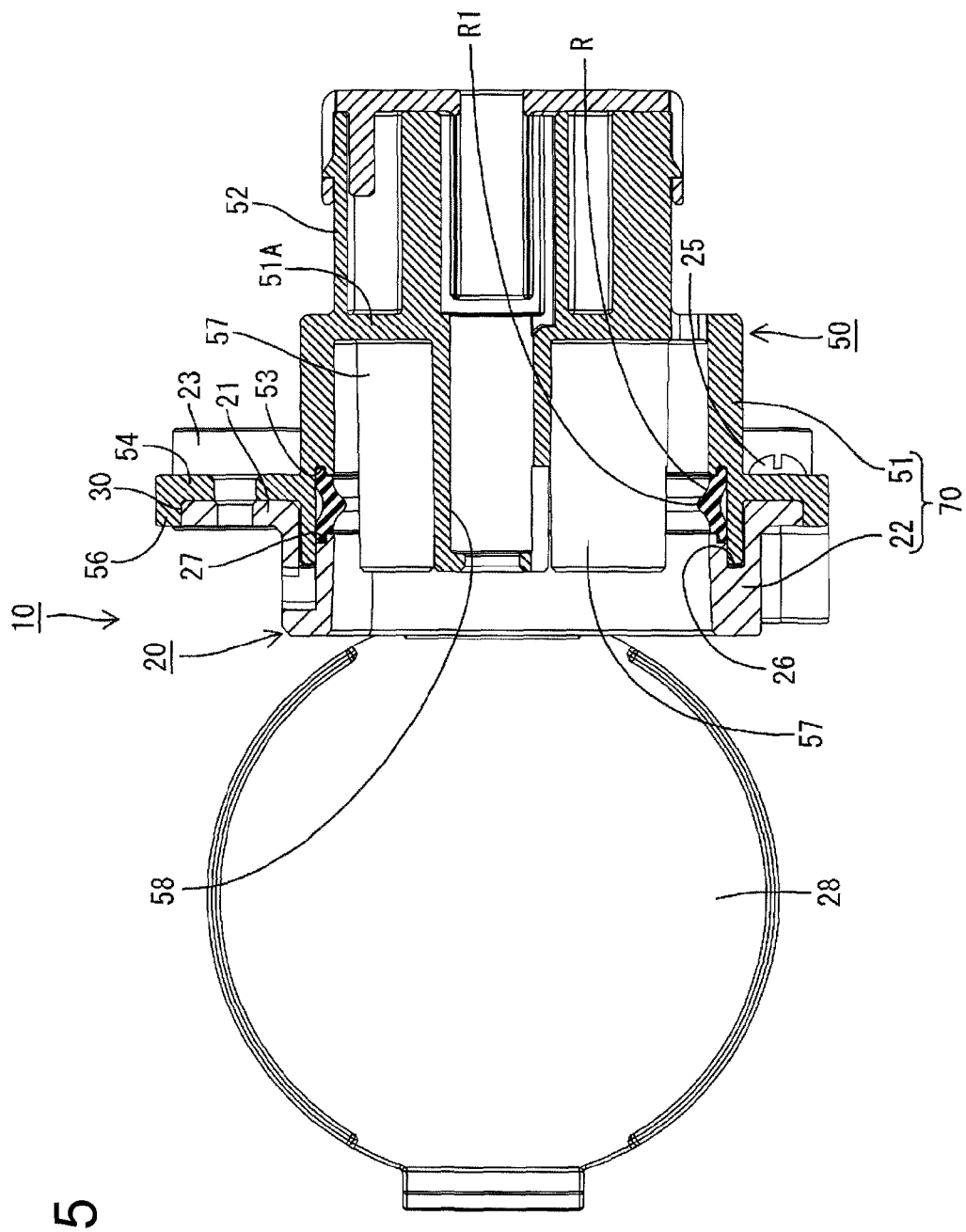
FIG. 5 is a section along V-V of FIG. 1.

As shown in FIG. 5, the vehicle-side connector 10 includes a mounting portion 20 to be fixed to the body of the vehicle and a connector main body 50 formed separately from the mounting portion 20. By assembling the connector main body 50 with the mounting portion 20 from behind, the vehicle-side connector 10 is formed.

Figure 6:
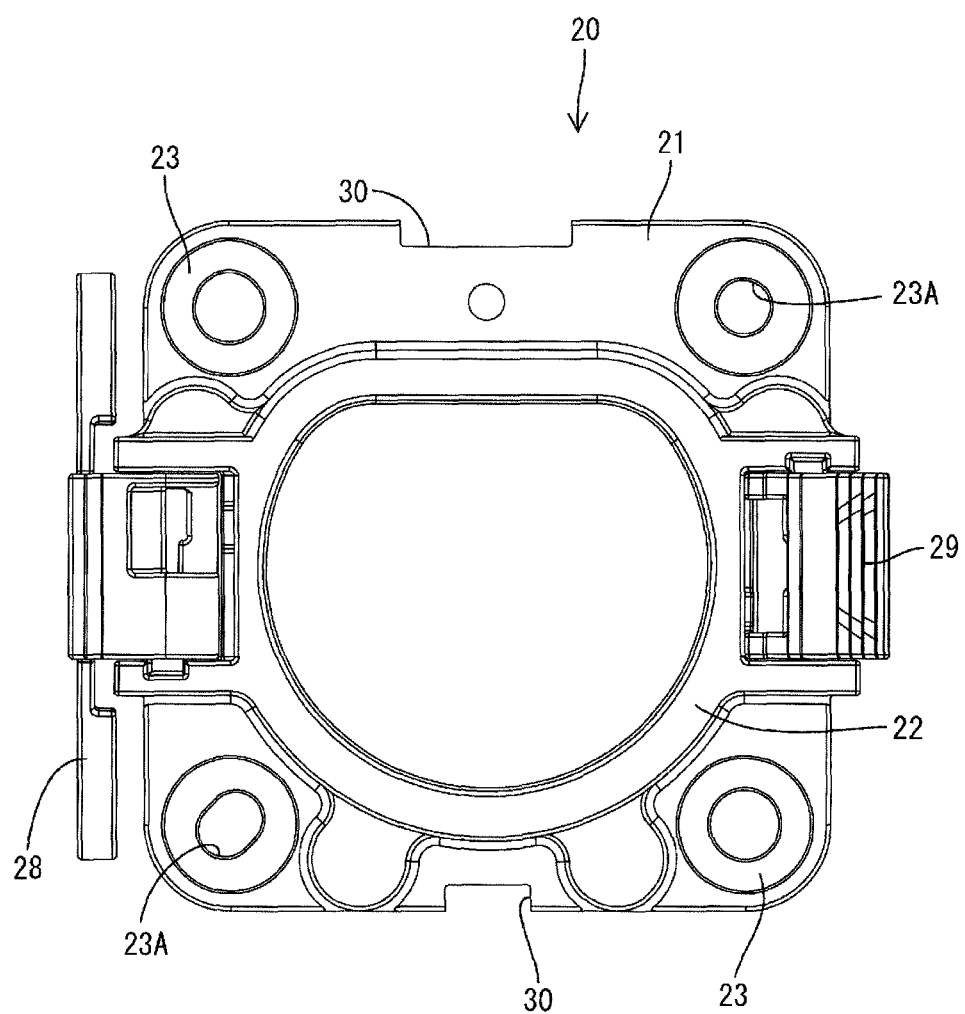
FIG. 6 is a front view of a mounting portion in the first embodiment.
Figure 7:
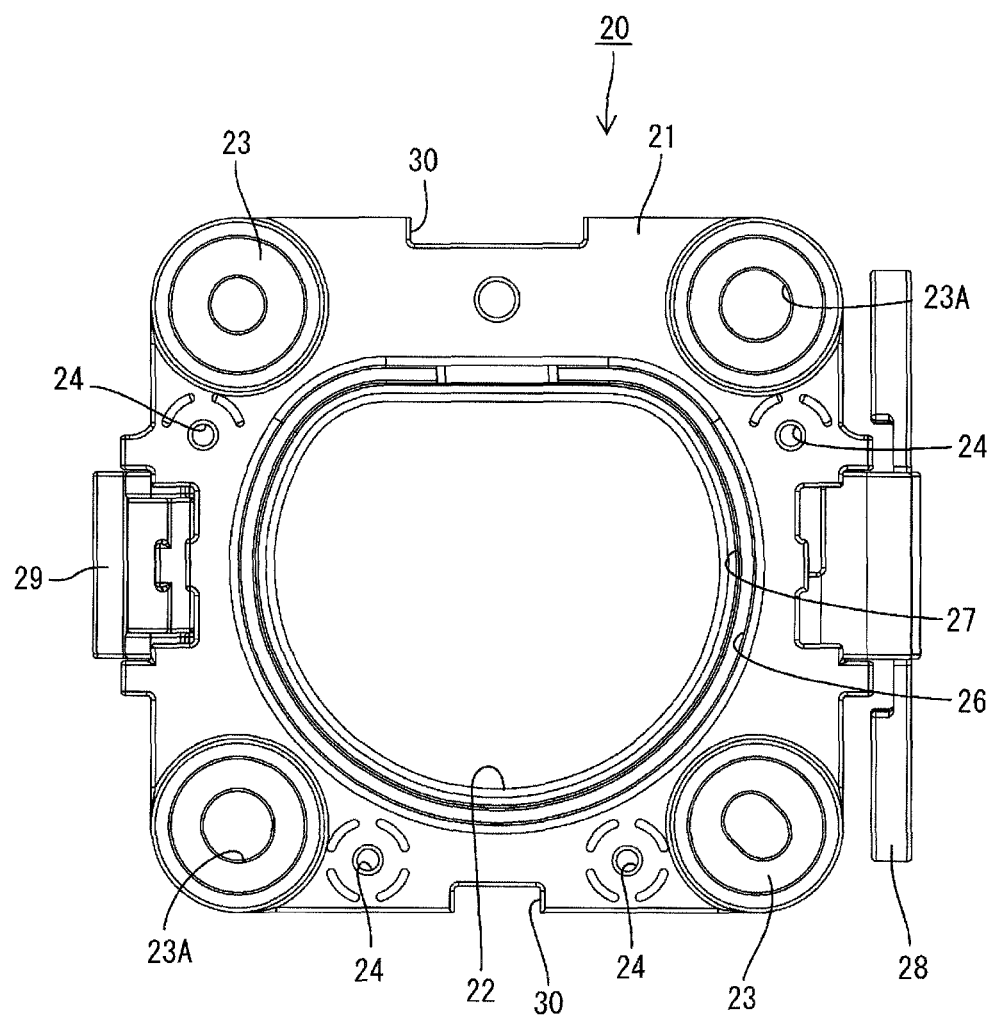
FIG. 7 is a rear view of a mounting portion in the first embodiment.
Figure 12:
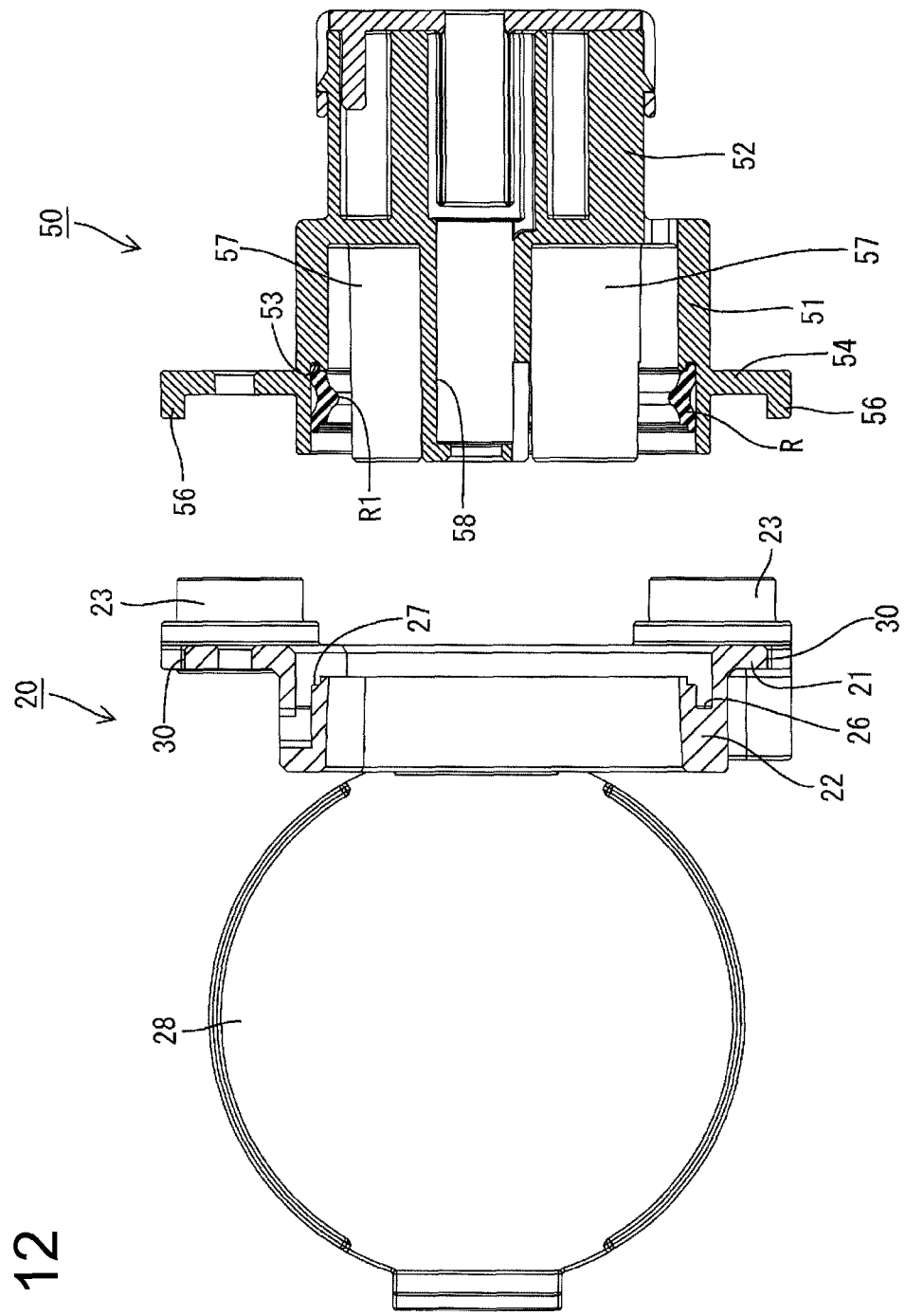
FIG. 12 is a section along XII-XII of FIG. 10.

The mounting portion 20 is made of synthetic resin and includes, as shown in FIGS. 6, 7 and 12, a mounting plate 21 in the form of a substantially rectangular flat plate and an accommodating portion 22 formed to penetrate through this mounting plate 21 in a front-back direction, which is a plate thickness direction.

Collars 23 each formed with a bolt insertion hole 23A in a center are mounted on four corners of the mounting plate 21, and the mounting plate 21 is fixed to the body of the vehicle to fix the vehicle-side connector 10 to the vehicle by inserting unillustrated fastening bolts into the bolt insertion holes 23A and tightening the fastening bolts into unillustrated bolt fastening holes provided on the body.

A plurality of screw fastening holes 24 are formed on the rear surface of the mounting plate 21. A total of four screw fastening holes 24 are formed, including two arranged below the collars 23 located in an upper part and two arranged between two collars 23 located in a lower part. Tapping screws (an example of "fastening members" of the present invention) can be tightened into these screw fastening holes 24 from behind.

The accommodating portion 22 has a substantially cylindrical shape and is formed to project forward from the front surface of the mounting plate 21. Further, the accommodating portion 22 is formed to be hollow in the front-back direction and the charging connector is fittable thereinto from front.

A fitting groove 26 recessed forward is formed over the entire circumference on a rear end opening edge part of the accommodating portion 22, and an accommodating portion-side mounting groove 27 is formed inside the fitting groove 26. The accommodating portion-side mounting groove 27 is formed along the fitting groove 26 and has a smaller depth than the fitting groove 26. Thus, the rear end opening edge part of the accommodating portion 22 is formed into a stepped shape over the entire circumference.

A lid portion 28 substantially in the form of a circular flat plate is held on a left part of the outer surface of the accommodating portion 22. The lid portion 28 is formed to be able to close a front end opening of the accommodating portion 22 and rotatable between a closing position (not shown) for closing the front end opening of the accommodating portion 22 and an opening position (see FIG. 1) for opening the front end opening of the accommodating portion 22. Further, a lock portion 29 for locking a right end part of the lid portion 28 is formed on a right part of the outer surface of the accommodating portion 22, and the lock portion 29 locks the right end part of the lid portion 28 to hold the lid portion 28 at the closing position.

As shown in FIGS. 5 and 12, the connector main body 50 includes a receptacle 51 which is open forward, and a terminal holding portion 52 which penetrates through a back wall 51A provided on the back of the receptacle 51 in the front-back direction.

The receptacle 51 has a tubular shape having a circular cross-section and is so formed that the charging connector is fittable thereinto. Further, a front end opening edge part of the receptacle 51 is formed to be fittable into the fitting groove 26 of the accommodating portion 22 of the mounting portion 20 from behind. When the connector main body 50 is properly assembled with the mounting portion 20 from behind and the front end opening edge part of the receptacle 51 is fitted into the fitting groove 26 of the accommodating portion 22, the accommodating portion 22 and the receptacle 51 are united to form a vehicle-side receptacle 70 as shown in FIG. 5. The charging connector is fittable into the vehicle-side receptacle 70 from front. When the charging connector is properly fitted into the vehicle-side receptacle 70, a tip part of the charging connector is inserted to the back of the vehicle-side receptacle 70 (back of the receptacle 51). Note that although not shown in this specification, a lock mechanism is provided between the charging connector and the vehicle-side connector 10.

As shown in FIG. 12, a receptacle-side mounting groove 53 in which a seal ring R made of a resilient material is mounted is formed on the front end opening edge part of the receptacle 51. The receptacle-side mounting groove 53 is recessed backward and formed over the entire circumference along the inner peripheral surface of the receptacle 51.

The receptacle-side mounting groove 53 is formed at a position facing the accommodating portion-side mounting groove 27 of the accommodating portion 22 of the mounting plate 20 in the front-back direction. When the front end opening edge part of the receptacle 51 is fitted into the fitting groove 26 of the accommodating portion 22 as shown in FIG. 5, the seal ring R is sandwiched from opposite front and rear sides by the accommodating portion-side mounting groove 27 and the receptacle-side mounting groove 53 and arranged at a substantially center position of the vehicle-side receptacle 70 in the front-back direction.

On the other hand, the seal ring R is annularly formed to have an angled cross-section. Further, an angled top part R1 as a central part of the seal ring R in the front-back direction protrudes inwardly. When the charging connector is fitted into the vehicle-side receptacle 70 (receptacle 51), the angled top part R1 of the seal ring R is held in close contact with the outer peripheral surface of the charging connector and opposite end parts of the seal ring R in the front-back direction are held in close contact with the inner peripheral surface of the receptacle 51, thereby preventing the entrance of water and the like through a clearance between the vehicle-side connector 10 and the charging connector.

Further, a depth of the receptacle-side mounting groove 53 is set to be substantially equal to that of the accommodating portion-side mounting groove 27. When the seal ring R is sandwiched from the opposite front and rear sides by the accommodating portion-side mounting groove 27 and the receptacle-side mounting groove 53, a rear end part of the seal ring R is fitted into the receptacle-side mounting groove 53 and a front end part of the seal ring R is fitted into the accommodating portion-side mounting groove 27, whereby opposite front and rear end parts of the seal ring R are held over the entire circumference.

Figure 8:
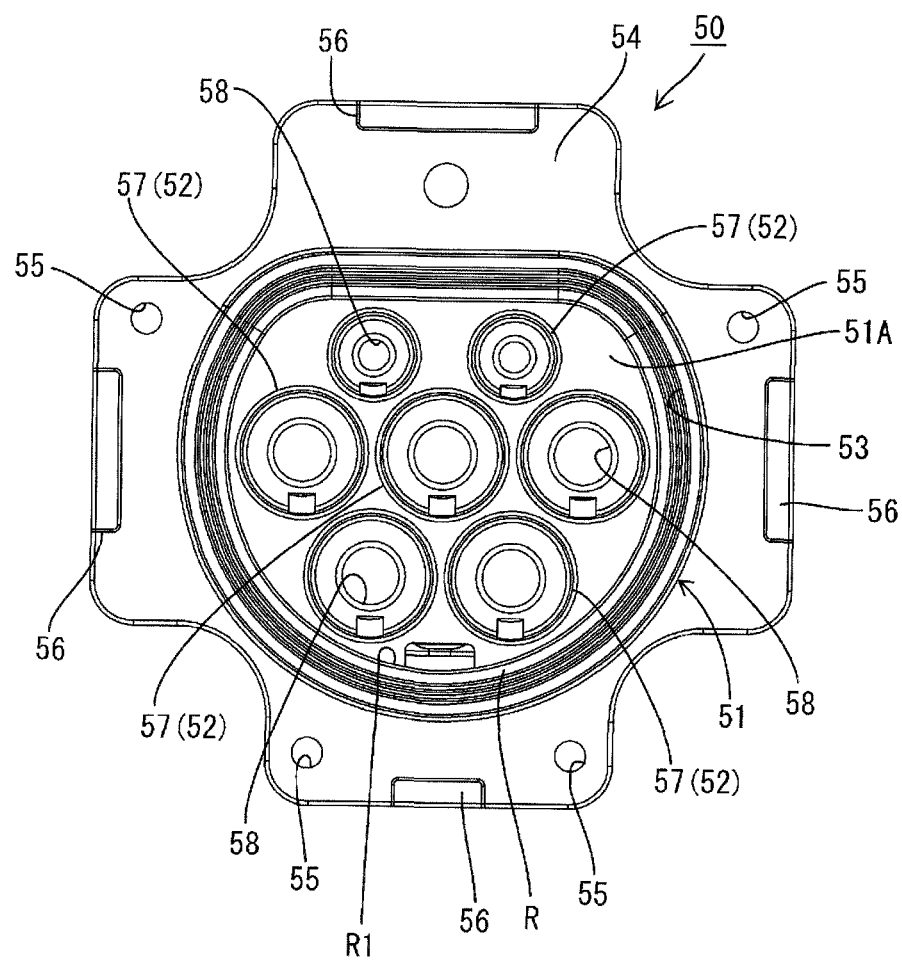
FIG. 8 is a front view of a main body in the first embodiment.
Figure 9:
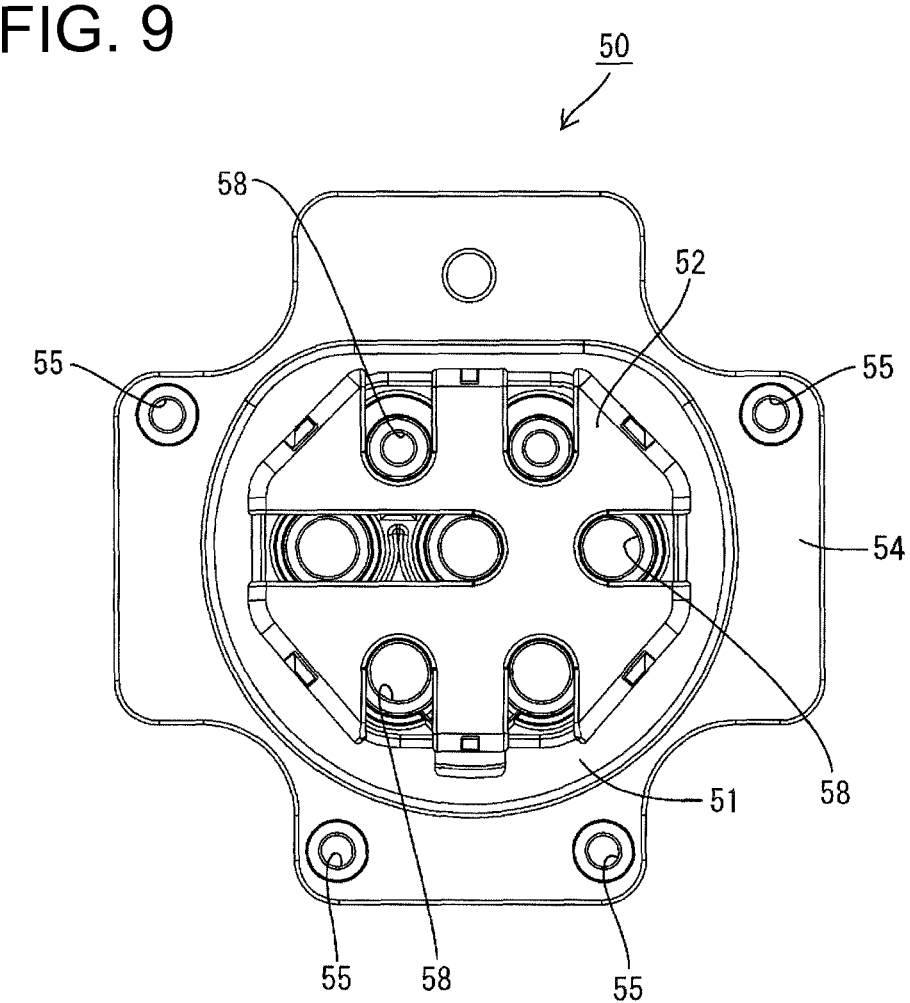
FIG. 9 is a rear view of the main body in the first embodiment.

As shown in FIG. 8, a projecting piece 54 in the form of a laterally protruding flat plate is formed on the outer peripheral surface of the receptacle 51.

Figure 1:
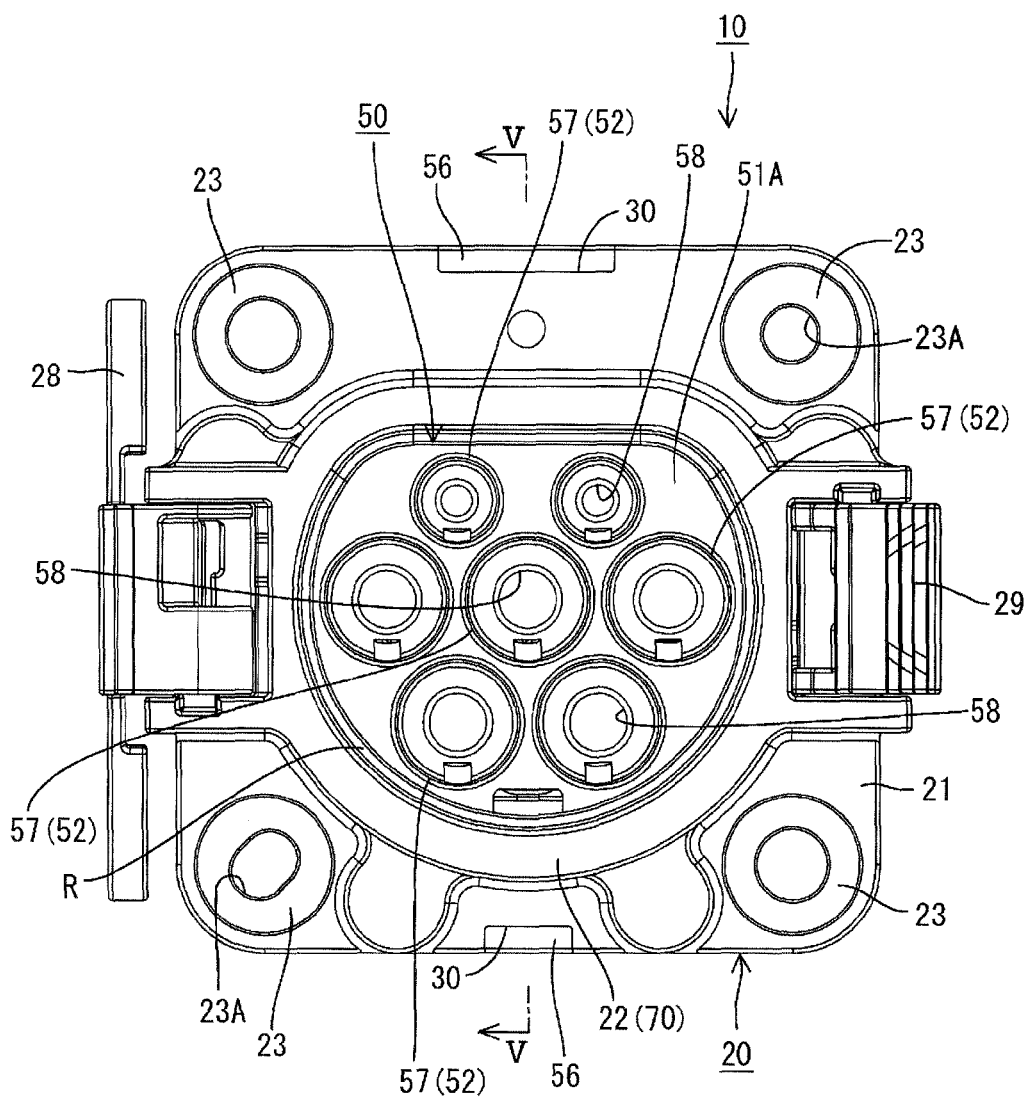
FIG. 1 is a front view of a vehicle-side connector in a first embodiment.
Figure 2:
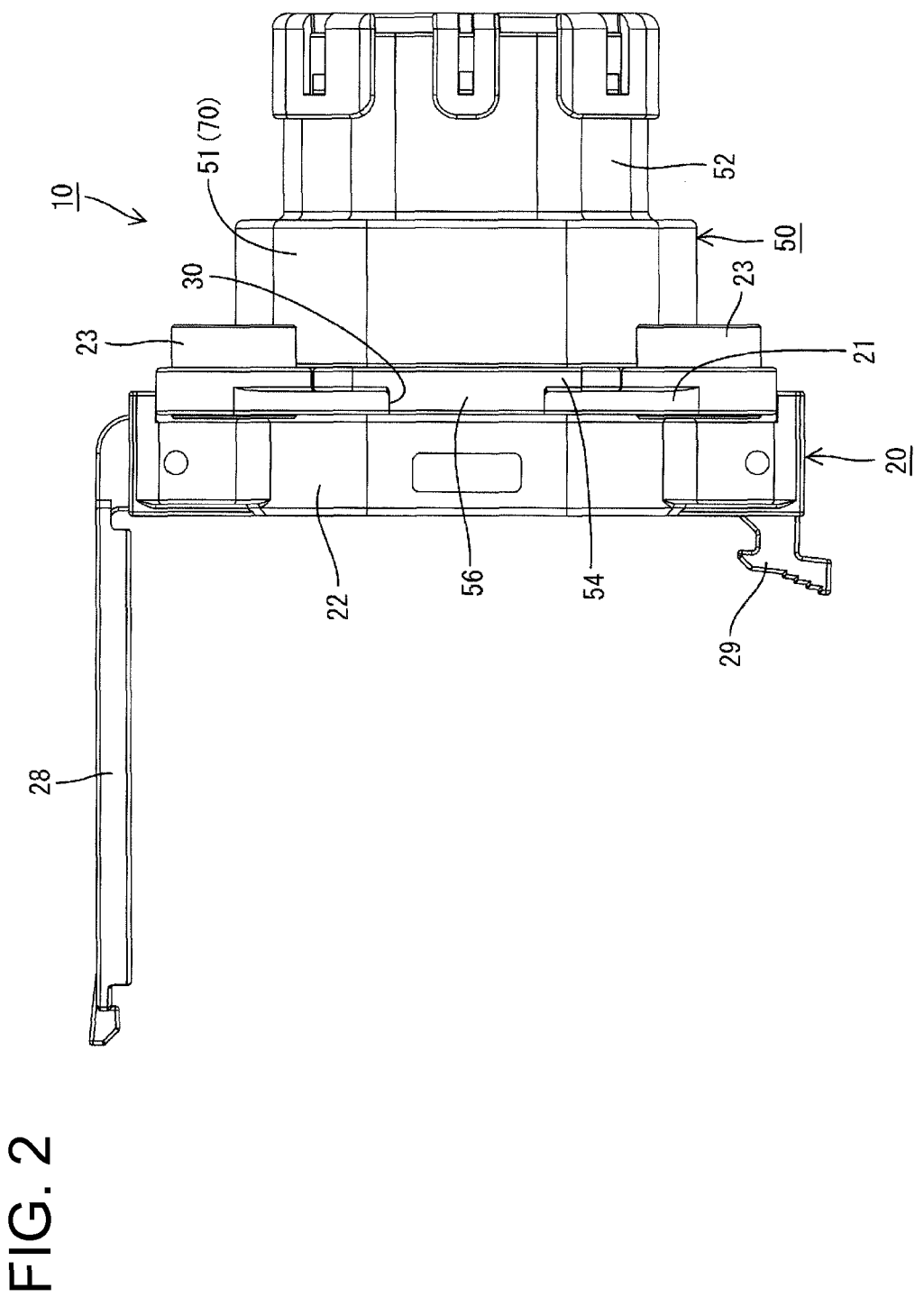
FIG. 2 is a plan view of the vehicle-side connector in the first embodiment.
Figure 3:
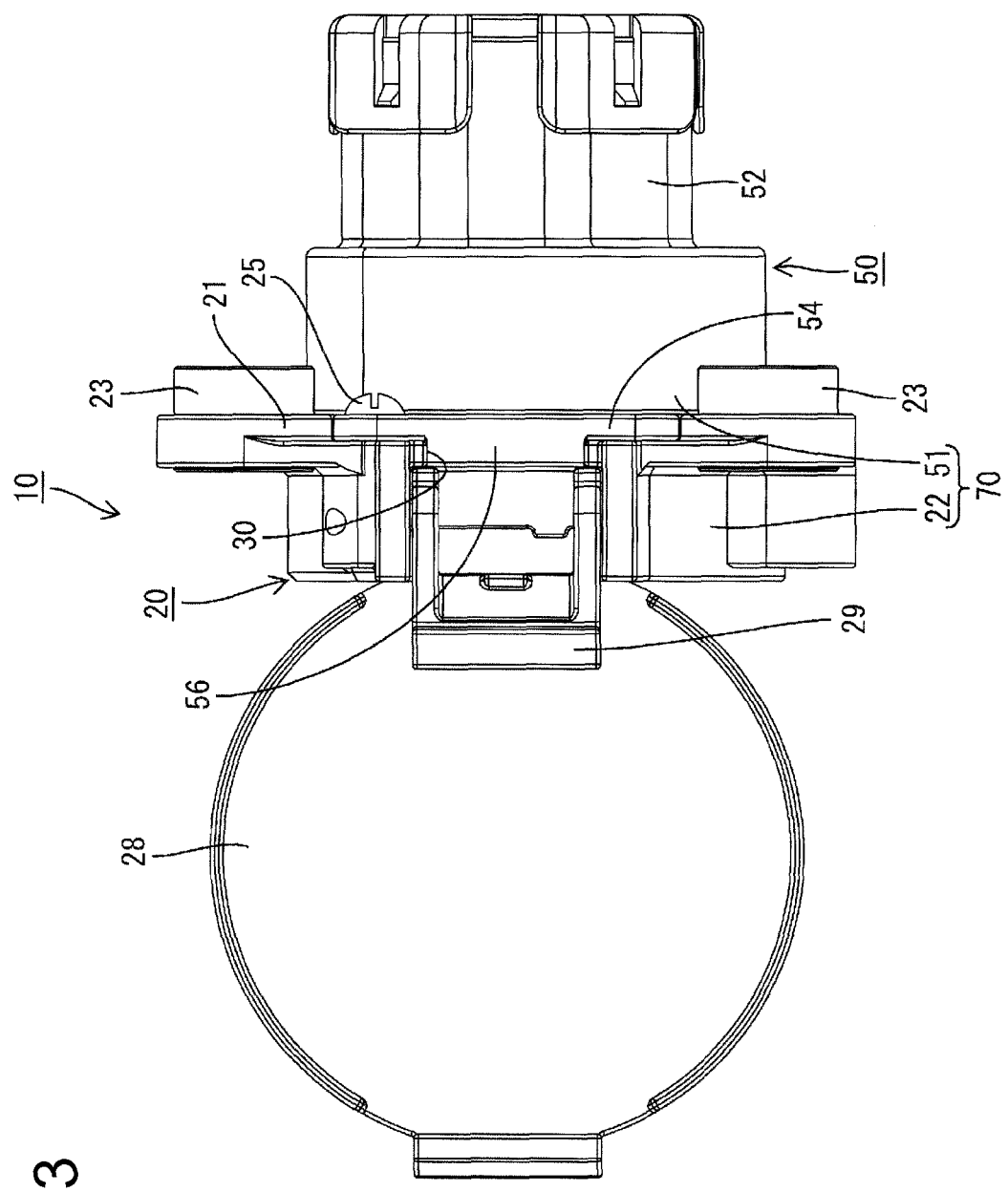
FIG. 3 is a side view of the vehicle-side connector in the first embodiment.
Figure 4:
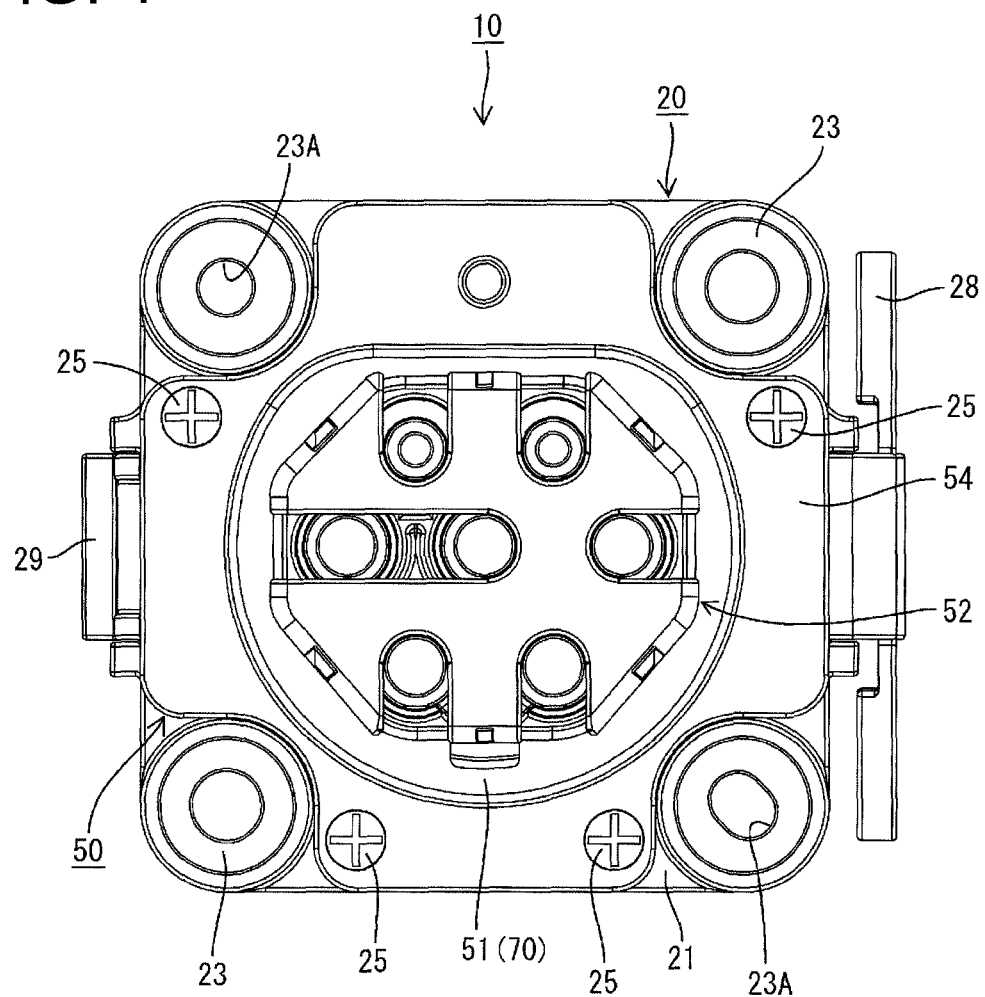
FIG. 4 is a rear view of the vehicle-side connector in the first embodiment.

The projecting piece 54 is formed over the entire circumference on the outer peripheral surface of the receptacle 51 and set to come into surface contact with the rear surface of the mounting plate 21 when the mounting portion 20 and the connector main body 50 are properly assembled. Further, the projecting piece 54 is formed with a plurality of (four in this embodiment) screw insertion holes 55 penetrating through the projecting piece 54 in the front-back direction. The screw insertion holes 55 are formed to correspond to the screw fastening holes 24 of the mounting plate 21. The mounting portion 20 and the connector main body 50 are integrally assembled as shown in FIGS. 3 to 5 by inserting tapping screws 25 into the screw insertion holes 55 and tightening them into the screw fastening holes 24 of the mounting plate 24 after the projecting piece 54 is brought into surface contact with the mounting plate 21.

Figure 10:
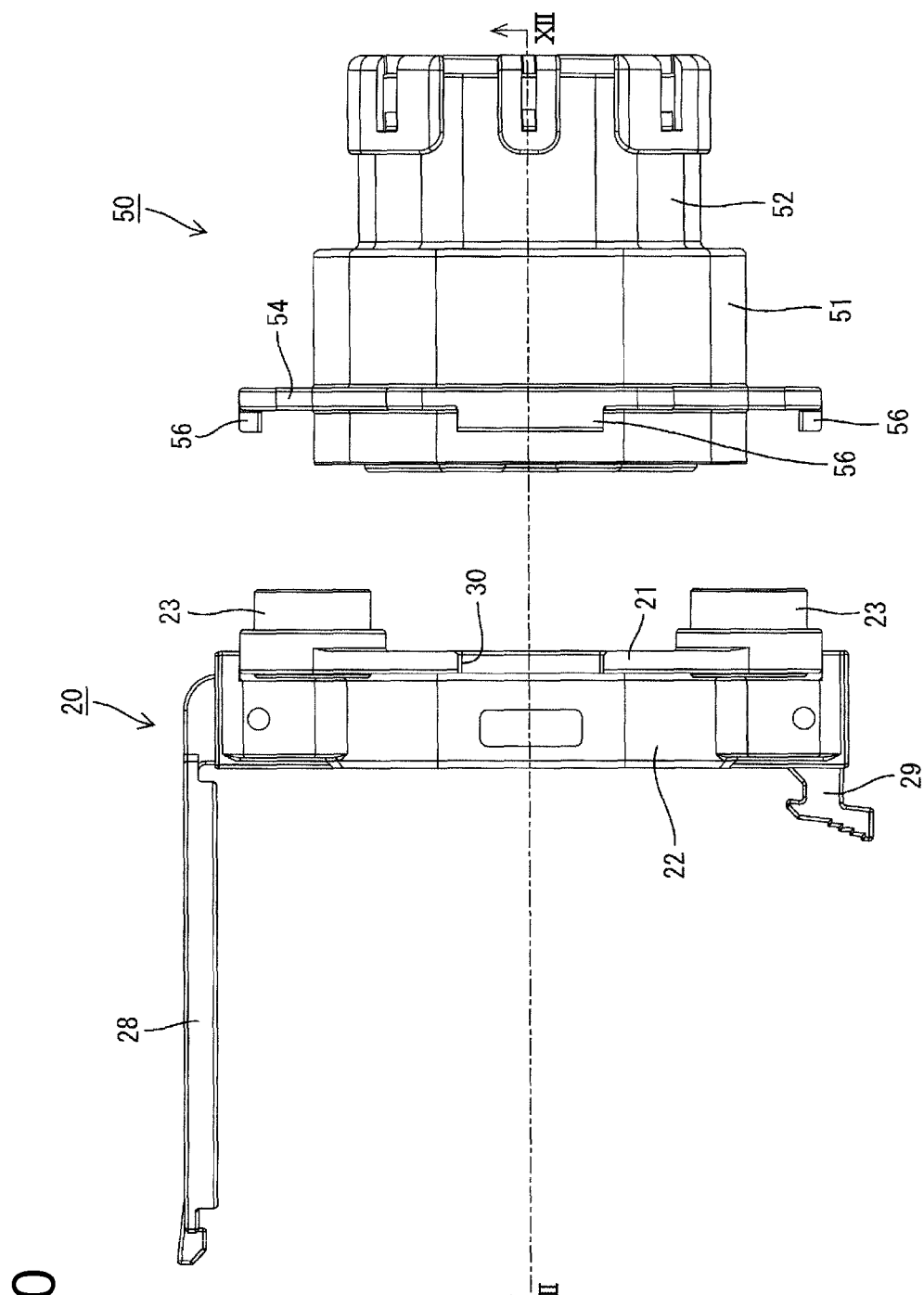
FIG. 10 is a plan view showing a state before the mounting portion and the main body in the first embodiment are assembled.
Figure 11:
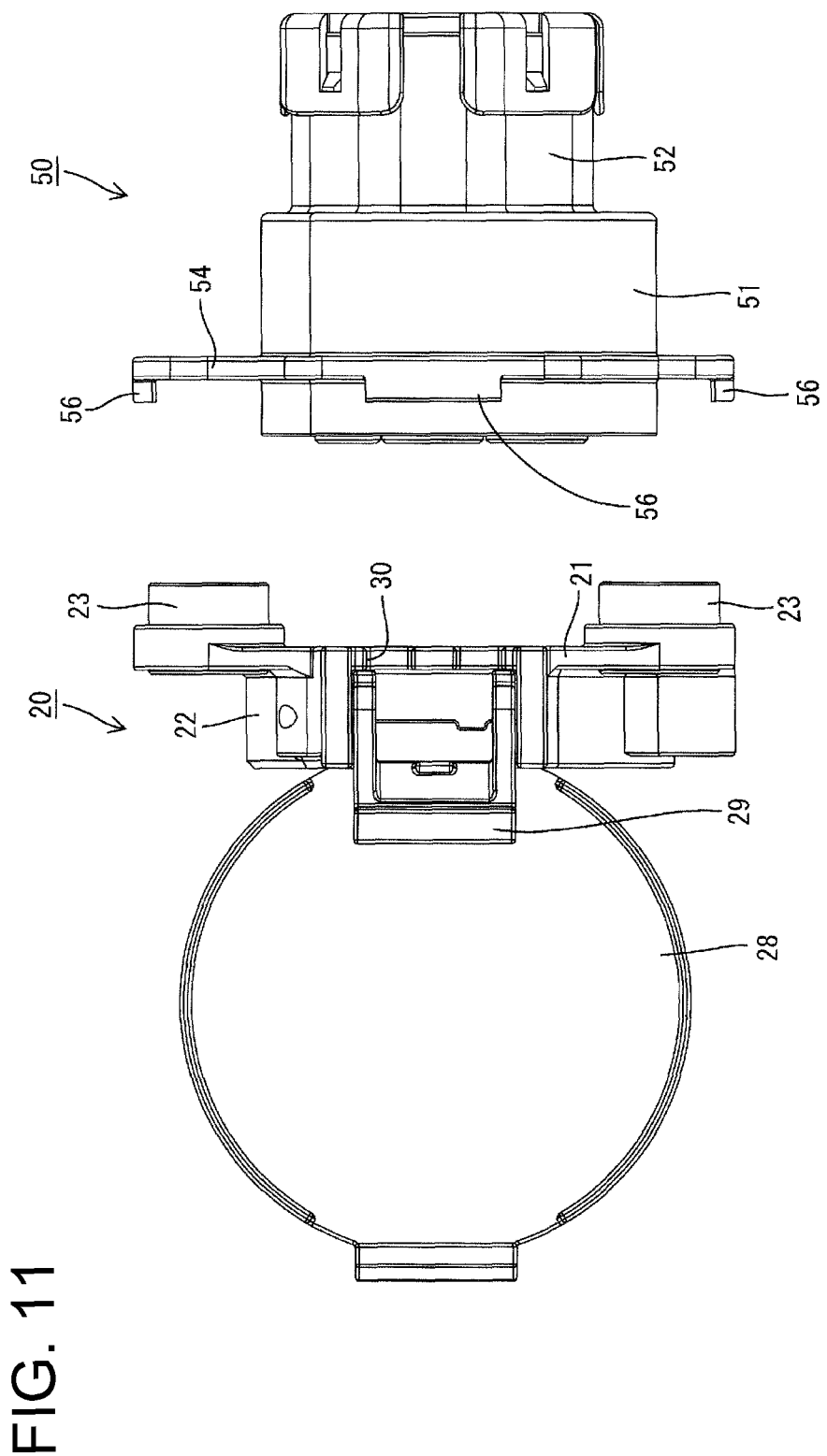
FIG. 11 is a side view showing the state before the mounting portion and the main body in the first embodiment are assembled.

Further, positioning pieces (an example of a "positioning portion" of the present invention) projecting forward are formed on upper, lower, left and right end edges of the projecting piece 54 as shown in FIGS. 10 to 12. On the other hand, positioning recesses (an example of a "positioned portion" of the present invention) 30, into which the positioning pieces 56 are fittable, are formed on upper, lower, left and right end edges of the mounting plate 21. The front end opening edge part of the receptacle 51 of the connector main body 50 is fitted into the fitting groove 26 of the accommodating portion 22 of the mounting portion 20 and the positioning pieces 56 are fitted into the positioning recesses 30, whereby the mounting portion 20 and the connector main body 50 are assembled without positional deviation. This enables the tapping screws 25 inserted into the screw insertion holes 55 to be reliably tightened into the screw fastening holes 24 of the mounting plate 21.

The positioning piece 56 located on a lower part of the projecting piece 54 and the positioning recess 30 located on a lower part of the mounting plate 21 are formed to be smaller than the positioning pieces 56 located on upper, left and right parts and the positioning recesses 30 located on upper, left and right parts. This can prevent erroneous assembling such as assembling of the vertically inverted connector main body 50 with the mounting portion 20.

As shown in FIGS. 10 to 12, the terminal holding portion 52 includes a plurality of (seven in this embodiment) terminal accommodating tube portions 57 projecting forward from the back wall 51A of the receptacle 51. All of the terminal accommodating tube portions 57 have a substantially cylindrical shape and are formed to be collectively fittable into an unillustrated small receptacle provided in the charging connector. When the charging connector and the vehicle-side connector 10 are properly connected, the small receptacle is fitted between the vehicle-side receptacle 70 and the terminal accommodating tube portions 57 and the small receptacle and the terminal accommodating tube portions 57 are connected.

Cavities 58 penetrating in the front-back direction are formed in the terminal accommodating tube portions 57. Unillustrated vehicle-side terminals are held in the cavities 58. When the small receptacle and the terminal accommodating tube portions 57 are properly connected, unillustrated external power source-side terminals provided in the small receptacle and the vehicle-side terminals are electrically conductively connected.

This embodiment is configured as described above. An assembling procedure of the vehicle-side connector 10 is briefly described and functions and effects of the vehicle-side connector 10 are described.

First, as shown in FIGS. 10 to 12, the mounting portion 20 and the connector main body 50 in which the seal ring R is mounted in the receptacle-side mounting groove 53 are prepared, the front end opening edge part of the receptacle 51 of the connector main body 50 is fitted into the fitting groove 26 of the accommodating portion 22 of the mounting portion 20 and the positioning pieces 56 on the projecting piece 54 of the connector main body 50 are fitted into the positioning recesses 30 on the mounting plate 21 of the mounting portion 20 from behind, whereby the connector main body 50 is assembled on the rear side of the mounting portion 20 without positional deviation.

Here, when the front end opening edge part of the receptacle 51 is properly fitted into the fitting groove 26, the projecting piece 54 of the connector main body 50 comes into surface contact with the rear surface of the mounting plate 21 of the mounting portion 20 and, simultaneously with that, the front end part of the seal ring R mounted in the receptacle-side mounting groove 53 is fitted into the accommodating portion-side mounting groove 27 of the accommodating portion 22 of the mounting portion 20, whereby the seal ring R is sandwiched in the front-back direction by the receptacle-side mounting groove 53 and the accommodating portion-side mounting groove 27. In this way, the seal ring R is held in close contact with the rear inner surface of the receptacle-side mounting groove 53 and the front inner surface of the accommodating portion-side mounting groove 27 and the entrance of water and the like through an interface between the mounting portion 20 and the connector main body 50 can be prevented.

Subsequently, the mounting portion 20 and the connector main body 50 are integrally assembled by inserting a plurality of tapping screws 25 into the respective screw insertion holes 55 of the projecting piece 54 and tightening the tapping screws 25 into the respective screw fastening holes 24 of the mounting plate 21. This can prevent the connector main body 50 from being detached from the mounting portion 20 in inserting and withdrawing the charging connector into and from the vehicle-side connector 10.

If the charging connector is pulled out in a state inclined from a proper posture in withdrawing the charging connector from the vehicle-side connector 10, a stress associated with the withdrawal concentrates between the screw fastening holes 24 and the tapping screws 25, which are a fastening part between the connector main body 50 and the mounting portion 20. However, since the connector main body 50 and the mounting portion 20 are integrally assembled with the projecting piece 54 held in surface contact with the mounting plate 21 from behind according to this embodiment, the stress associated with the withdrawal can be dispersed to the fastening part and the mounting plate 21 and the projecting piece 54, which are a surface contact part. This can suppress the concentration of a stress on the fastening part between the connector main body 50 and the mounting portion 20 and prevent the connector main body 50 from being detached from the mounting portion 20 as the charging connector is withdrawn as compared with the case where the connector main body is assembled with the mounting portion from front.

Finally, the vehicle-side connector 10 is completed by inserting the unillustrated vehicle-side terminal connected to an end of a wire into each cavity 58 of the connector main body 50.

Intervals between unillustrated bolt fastening holes provided on the body to which the vehicle-side connector 10 is to be fixed are set at various sizes depending on a manufacturer for manufacturing the vehicle, a vehicle type and the like. Thus, even if the receptacle 51 and the terminal holding portion 52 of the connector main body 50 to which the charging connector is to be connected have the same specifications, the positions of the bolt insertion holes 23A on the mounting plate 21 need to be changed. Accordingly, in the case of a conventional vehicle-side connector in which a mounting portion mounted with collars 23 and a connector main body are integrally formed, not only the mounting portion, but also the connector main body needs to be exchanged. However, according to this embodiment, the vehicle-side connector 10 can correspond to various vehicles by selecting the mounting portion 20 corresponding to the bolt fastening holes of the vehicle out of a plurality of mounting portions having different shapes and sharing the connector main body 50. Specifically, the vehicle-side connector 10 can correspond to various vehicles by fabricating molding dies for molding only the mounting portion 20 and molding only the mounting portion 20 in correspondence with each vehicle. This can reduce production cost of molding dies as compared with the case of fabricating molding dies for integrally molding a mounting portion and a connector main body.

A second embodiment is described with reference to FIGS. 13 and 14.

Figure 13:
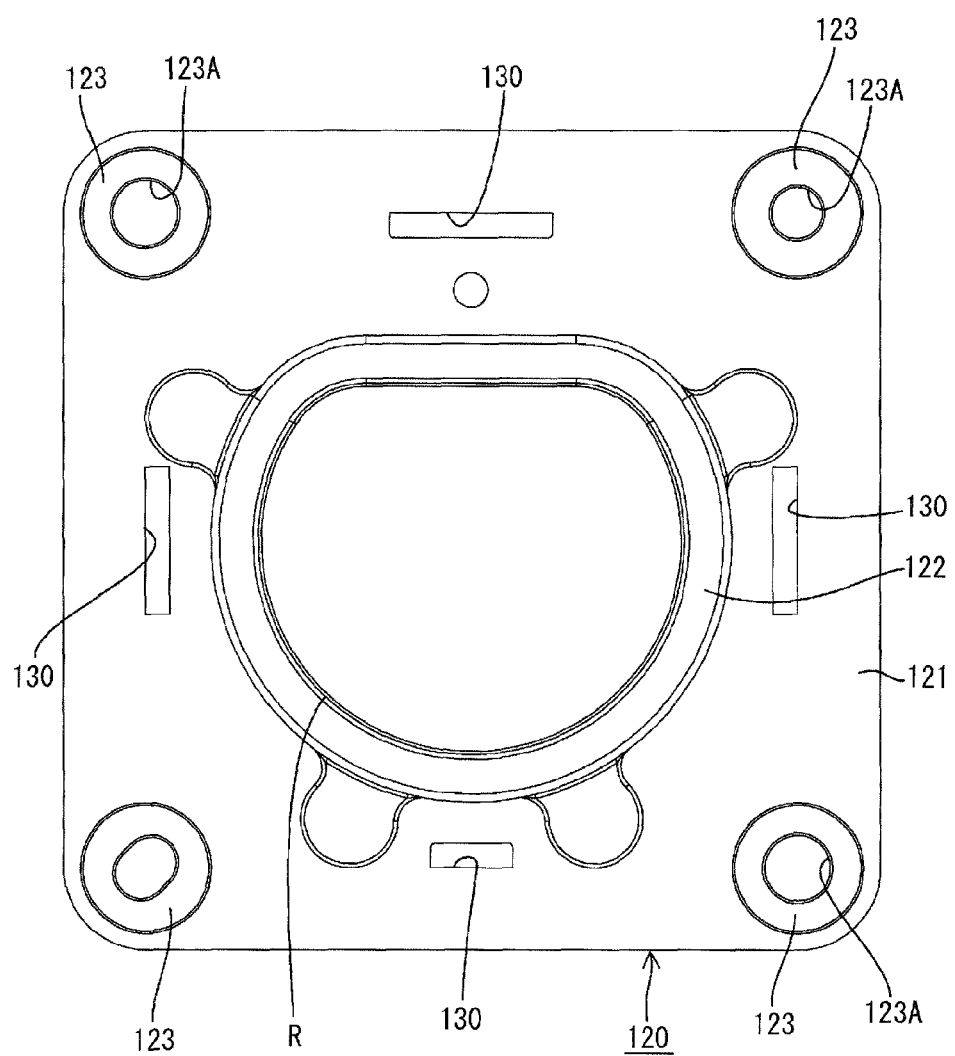
FIG. 13 is a front view of a mounting portion in a second embodiment.
Figure 14:
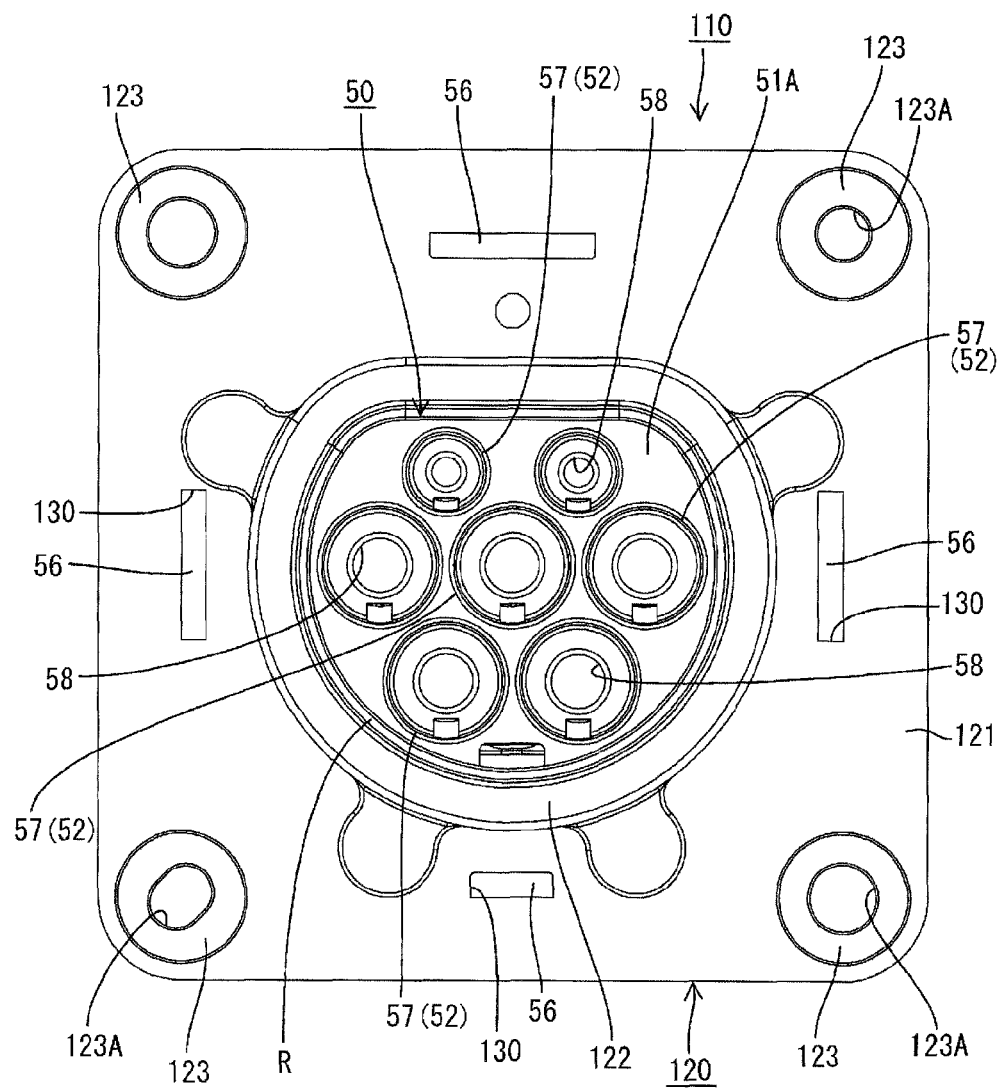
FIG. 14 is a front view showing a state where a main body is assembled with the mounting portion in the second embodiment.

A mounting portion 120 of the second embodiment is obtained by changing the shape of the mounting plate 21 of the first embodiment as shown in FIGS. 13 and 14 and configurations, functions and effects common to the first embodiment are not described to avoid repeated description. Further, the same components as in the first embodiment are denoted by reference numerals obtained by adding 100 to the reference numerals of the first embodiment.

A mounting plate 121 of the mounting portion 120 of the second embodiment is formed to be one size larger than the mounting plate 21 of the first embodiment. Similarly to the mounting plate 21 of the first embodiment, collars 123 each formed with a bolt insertion hole 123A are mounted on four corners of the mounting plate 121. Specifically, distances between the bolt insertion holes 123A of the second embodiment are longer than those between the bolt insertion holes 23A of the first embodiment so as to be able to deal with unillustrated bolt fastening holes provided on a body of a vehicle and having longer intervals. Note that the connector main body 50 is shared and also assembled with the mounting portion 120, and the mounting portion 120 and the connector main body 50 are integrally assembled as shown in FIG. 14 by tightening tapping screws 25.

Further, positioning holes (an example of the "positioned portion" of the present invention) 130 penetrating through the mounting plate 121 in a plate thickness direction are formed at positions corresponding to the positioning pieces 56 of the connector main body 50, and the connector main body 50 is assembled with the mounting portion 120 without positional deviation by fitting the positioning pieces 56 into the positioning holes 130.

Further, the mounting portion 120 is not provided with the lid portion 28 and the lock portion 29 provided on the left and right sides of the accommodating portion 22 of the first embodiment so as to also deal with a case where it is not necessary to close the front end opening of the vehicle-side receptacle 70 due to a difference in vehicle type or the like. Specifically, the presence or absence of the lid portion 28 can be dealt with by sharing the connector main body 50 and exchanging only the mounting portions 20, 120. This can reduce manufacturing cost for molding dies and the like in terms of the presence or absence of the lid portion 28.

The present invention is not limited to the above described and illustrated embodiments. For example, the following embodiments are also included in the technical scope of the present invention.

(1) Although seven terminal accommodating tube portions 57 are provided in the vehicle-side receptacle 70 in the above embodiments, the present invention is not limited to such a mode. For example, there may be four or five terminal accommodating tube portions.

(2) Although the positioning pieces 56 are formed on the upper, lower, left and right parts of the projecting piece 54 in the above embodiments, the present invention is not limited to such a mode. For example, the positioning pieces may be formed only on the upper and lower parts or on the left and right parts.

(3) Although the receptacle 51 of the connector main body 50 is fitted into the accommodating portion 22, 122 in the above embodiments, the present invention is not limited to such a mode. For example, the accommodating portion of the mounting portion may be fitted into the receptacle of the connector main body.

Figure 15:
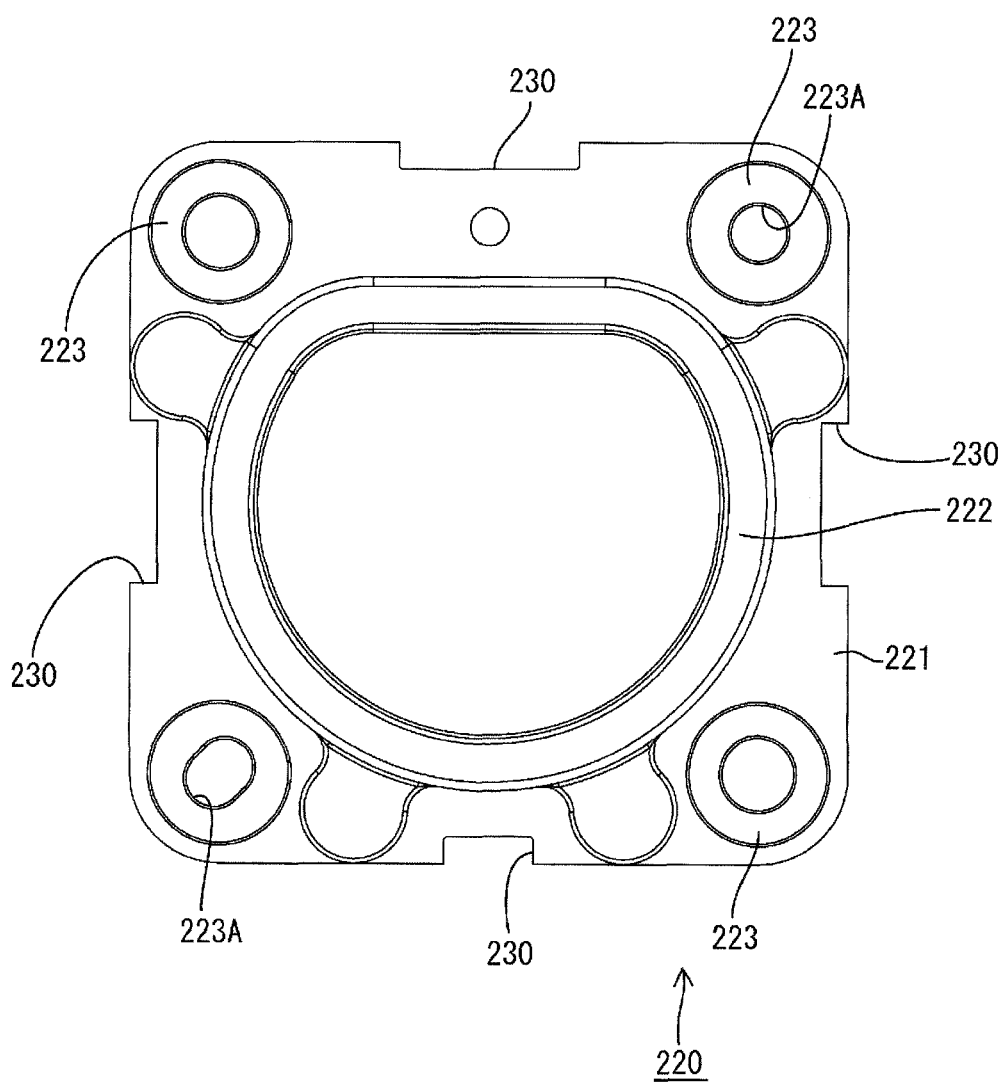
FIG. 15 is a front view of a mounting portion in another embodiment.
Figure 16:
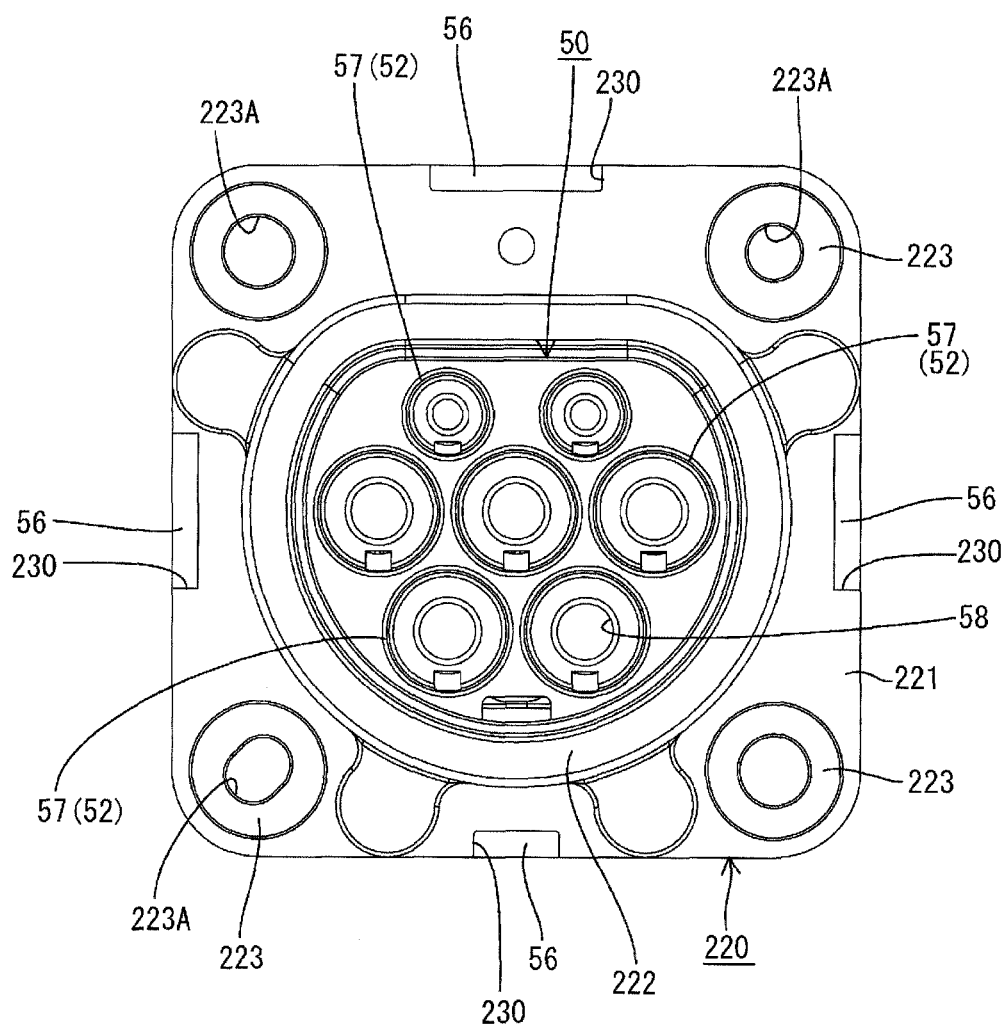
FIG. 16 is a front view showing a state where a main body is assembled with the mounting portion in the other embodiment.

(4) Although the mounting portion 20 is formed with the lid portion 28 and the lock portion 29 in the first embodiment and the mounting plate 121 is formed to be larger than that of the first embodiment in the second embodiment, the present invention is not limited to such a mode. For example, as shown in FIGS. 15 and 16, a mounting plate 221 may have the same size as in the first embodiment and an accommodating portion 222 may be formed with neither a lid portion nor a lock portion. Note that, in FIGS. 15 and 16, the same components as in the first embodiment are denoted by reference numerals obtained by adding 200 to the reference numerals of the first embodiment.

(5) Although the mounting portion 20 and the connector main body 50 are integrally fixed by the tapping screws in the above embodiments, the present invention is not limited to such a mode. For example, the mounting portion and the connector main body may be fixed by a known method such as brazing and welding.

The invention claimed is:

1. A vehicle-side connector which is fixed to a vehicle body by tightening bolts and connected to a charging connector in charging a battery of a vehicle, comprising:
   a connector main body which is made of synthetic resin and to which the charging connector is connected; and
   a mounting portion which is made of synthetic resin, includes bolt insertion holes, into which the bolts are insertable, and is fixed to the vehicle body by inserting the bolts into the bolt insertion holes and tightening the bolts into the vehicle body;
   wherein:
   the mounting portion is fixed after being assembled with the connector main body;
   the mounting portion includes a mounting plate which is formed into a plate-like shape and an accommodating portion which is formed to penetrate through the mounting plate in a front-back direction and into which the connector main body is fitted from behind and the charging connector is fitted from front;
   a projecting piece capable of coming into surface contact with the mounting plate is formed to project from the outer surface of the connector main body; and
   the projecting piece is formed with a positioning portion fittable to a positioned portion provided on the mounting plate.

2. A vehicle-side connector according to claim 1, wherein:
   the connector main body and the mounting portion are integrally assembled by bringing the projecting piece into surface contact with the mounting plate from behind and inserting a plurality of fastening members through the projecting piece from behind and tightening the fastening members into the mounting plate.

3. A vehicle-side connector according to claim 1, further comprising a lid portion for closing an opening part of the connector main body into which the charging connector is fitted,
   wherein the lid portion is provided on the mounting portion.

4. A vehicle-side connector according to claim 1, further comprising a seal ring to be held in close contact with the outer peripheral surface of the charging connector and the inner peripheral surface of the connector main body over the entire circumference when the connector main body and the charging connector are properly connected.

5. A vehicle-side connector according to claim 4, wherein:
   the seal ring is sandwiched from opposite front and rear sides in a part where the accommodating portion and the connector main body face each other in a front-back direction.

* * * * *